United States Patent [19]
Herzberg

[11] Patent Number: 6,034,996
[45] Date of Patent: Mar. 7, 2000

[54] SYSTEM AND METHOD FOR CONCATENATING REED-SOLOMON AND TRELLIS CODES

[75] Inventor: Hanan Herzberg, Morganville, N.J.

[73] Assignee: Globespan, Inc., Red Bank, N.J.

[21] Appl. No.: 08/944,942

[22] Filed: Oct. 2, 1997

Related U.S. Application Data

[60] Provisional application No. 60/050,240, Jun. 19, 1997.

[51] Int. Cl.[7] ........................................... H04L 5/12
[52] U.S. Cl. .......................... 375/265; 714/758; 714/784; 714/792
[58] Field of Search ..................... 375/365, 295, 375/261; 714/758, 759, 784, 792

[56] References Cited

U.S. PATENT DOCUMENTS

| | | | |
|---|---|---|---|
| 3,988,677 | 10/1976 | Fletcher et al. | 325/41 |
| 4,821,268 | 4/1989 | Berlekamp | 371/37 |
| 5,329,551 | 7/1994 | Wei | 375/17 |
| 5,363,408 | 11/1994 | Paik et al. | 375/39 |
| 5,442,626 | 8/1995 | Wei | 375/20 |
| 5,511,096 | 4/1996 | Huang et al. | 375/265 |
| 5,659,578 | 8/1997 | Alamouti et al. | 375/261 |

*Primary Examiner*—Stephen Chin
*Assistant Examiner*—Mohammad Ghayour
*Attorney, Agent, or Firm*—Thomas, Kayden, Horstemeyer & Risley, L.L.P.

[57] ABSTRACT

An apparatus is provided for concatenating Reed-Solomon and trellis encoders. Preferably, the apparatus includes an input for receiving a plurality of information bits. The plurality of information bits are divided or defined to comprise a first portion and a second portion. A Reed-Solomon encoder is disposed to receive the second portion of input bits and generate a first encoded output. A trellis encoder disposed to receive the output of the Reed-Solomon encoder and configured to generate a second encoded output. Finally, a mapper is disposed to receiver the bits output from the trellis encoder as well as the first portion of input bits. Consistent with the invention, the mapper is configured to generate output signals that are uniquely defined by the input bits in accordance with, for example, a set partition, wherein the first portion of input bits are defined by the mapper to generate output symbols having larger Euclidean distances than the Euclidean distances separating the symbols defined by the second encoded output bits.

13 Claims, 5 Drawing Sheets

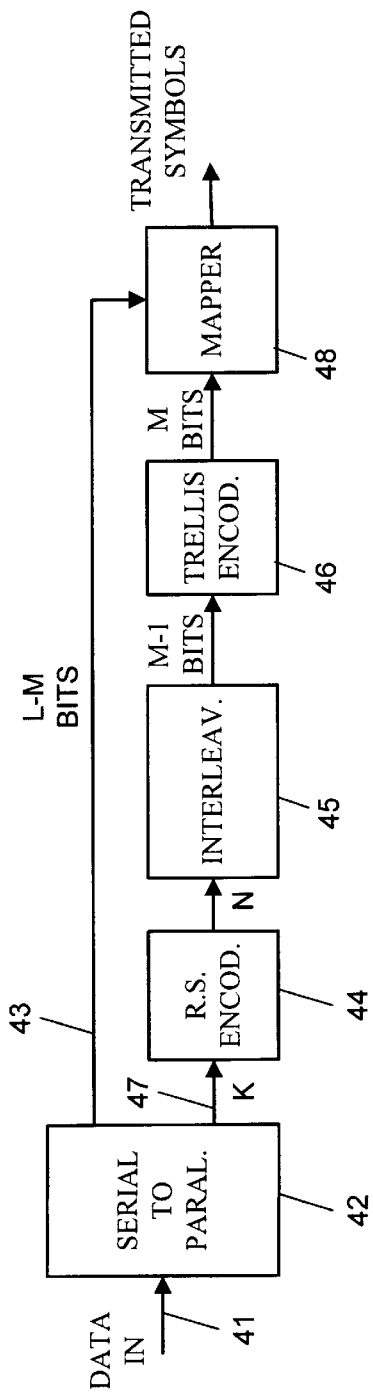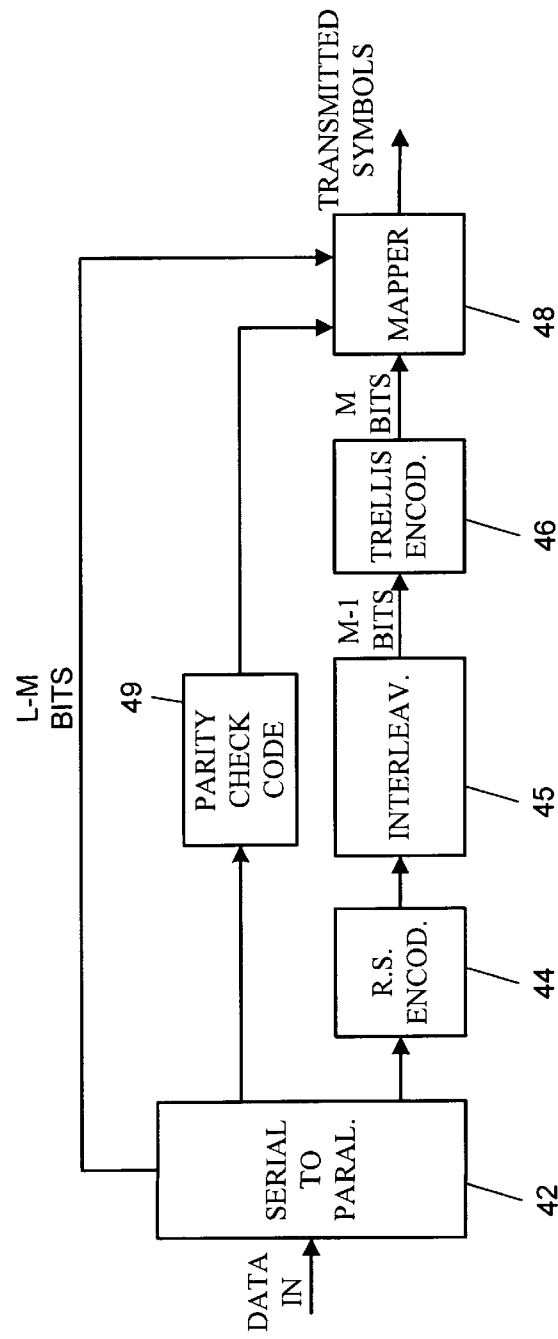

SYSTEM AND METHOD FOR CONCATENATING REED-SOLOMON AND TRELLIS CODES

CROSS-REFERENCE TO RELATED APPLICATIONS

This application claims the benefit of U.S. Provisional Applications Ser. No. 60/050,240, filed Jun. 19, 1997, and entitled System and Method for Concatenating Reed-Solomon and Trellis Encoders.

BACKGROUND OF THE INVENTION

1. Field of the Invention

The present invention generally relates to communications systems, and more particularly to an improved system and method for concatenating Reed-Solomon and trellis encoders.

2. Discussion of the Related Art

In recent years, there has been significant research and development in the area of communications. Significantly, there is an ever increasing demand for increased data communication rates for the purpose of decreasing data transmission time. However, an increase in the rate of the data used to modulate the carrier frequency typically results in increased bandwidth requirements.

In an effort to increase the data rates without sacrificing the available bandwidth, a number of modulation schemes together with sophisticated coding techniques have been developed. The coding of data in a transmitter, prior to transmission, and decoding of data in a receiver, after transmission, is generally referred to as "channel coding." The basic motivation for channel coding has been to reduce the frequency of errors in the output information bit stream for a give signal to noise ration, or conversely, to increase the transmission rates at which information can be transmitted with a given probability of error ($P_e$). Stated another way, bandwidth efficient line codes can be used to provide higher bit rates in a given bandwidth, or, alternatively, they can also be used to reduce the required bandwidth for a given bit rate.

For example, Quadrature Amplitude Modulation (QAM) employs both amplitude and phase modulation in order to encode more data within a given frequency bandwidth. Carrierless amplitude modulation and phase modulation (CAP) is an encoding method that utilizes a two-dimensional multilevel modulation scheme. As is known, these high level modulation schemes are very sensitive to channel impairments. That is, the information encoded by means of such techniques is often lost during transmission due to noise, Raleigh fading and other factors which are introduced over the communication medium.

In order to compensate for the increased sensitivity of these high level modulation schemes, various forward error detection and error correction coding techniques are employed. Reed-Solomon and trellis are two commonly used and well known forward error correction coding techniques. As is well known, these techniques are often used together, since they complement one another. In this regard, trellis encoders, which are implemented to protect data against channel impairments, are known to be susceptible to producing burst errors, because trellis encoders make decoding decisions over several symbols. As a result, if the path is incorrect, several symbols along that path may be incorrectly decoded. The purpose of Reed-Solomon encoding is to compensate for burst errors made by the trellis encoder.

In a common communications system, these techniques are combined by directing an information word (a series of information bits of a predetermined length to be transmitted) of length k symbols is input to a Reed-Solomon encoder. In a manner that is well known, the Reed-Solomon encoder generates n-k parity symbols, for an output of length n symbols. This output is then time displaced by an interleaver before being directed to the trellis encoder for further encoding. The trellis encoder, which generally operates only on a few of the coded bits output from the Reed-Solomon encoder, generates further redundancy in the transmitted signal.

U.S. Pat. No. 3,988,677 to Fletcher et al. and U.S. Pat. No. 5,659,578 to Alamouti et al. examples of two systems that concatenate Reed-Solomon and trellis encoders. A common trait among the systems of the prior art, as is illustrated in both of the foregoing patented systems, is that all of the information bits from the data source are encoded by the Reed Solomon encoder. As the length of the data word increases, the size of the interleaver, interposed between the Reed-Solomon encoder and trellis encoder, increases as well.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to an improved system and method for concatenating Reed-Solomon and trellis encoders. In this regard, a fundamental concept recognized by the present invention relates to the realization that, due to the symbol mapping that occurs downstream of the trellis encoder, certain bits of an information word are accorded a greater degree of natural protection than certain other bits. By recognizing this fundamental concept, a device constructed in accordance with the present invention may be implemented to code those bits that are more susceptible to channel impairments are rely on the natural protection to guard the remaining bits. As will be appreciated from the discussion that follows, the present invention realizes a communications system requiring less memory and having a shorter transmission delay or latency.

In accordance with one aspect of the present invention, an apparatus is provided for concatenating Reed-Solomon and trellis encoders. Preferably, the apparatus includes an input for receiving a plurality of information bits. The plurality of information bits are divided or defined to comprise a first portion and a second portion. A Reed-Solomon encoder is disposed to receive the second portion of input bits and generate a first encoded output. A trellis encoder is disposed to receive the output of the Reed-Solomon encoder and configured to generate a second encoded output. Finally, a mapper is disposed to receive the bits output from the trellis encoder as well as the first portion of input bits. Consistent with the invention, the mapper is configured to generate output signals that are uniquely defined by the input bits, wherein the first portion of input bits are defined by the mapper to generate output symbols having the larger Euclidean distances than the Euclidean distances separating the symbols defined by the second encoded output bits.

In accordance with another aspect of the invention, a method is provided for concatenating Reed-Solomon and trellis codes. Preferably, the method comprises the step of receiving a plurality of information bits, the information bits being defined by a first portion of input bits and a second portion of input bits. The method further includes the step of encoding the second portion of the plurality of information bits with a Reed-Solomon encoder, wherein the Reed-Solomon encoder is configured to generate a plurality of first encoded output bits. Thereafter, the method encodes a plurality of the first encoded output bits with a trellis encoder, wherein the trellis encoder generates a plurality of second encoded output bits. Finally, the preferred embodiment includes the step of mapping the first portion of information bits into a signal constellation. It will be appreciated that, in accordance with the invention, the mapper maps all of the first encoded output bits that are not encoded by the trellis encoder, and the second encoded output bits, to generate output symbols defined by the signal constellation, wherein the first portion of input bits are defined by the mapper to generate output symbols having the larger Euclidean distances than the Euclidean distances separating the symbols defined by the second encoded output bits.

In accordance with yet another embodiment, an apparatus is provided for receiving concatenated Reed-Solomon and trellis codes. In accordance with the inventive concepts, the receiver includes a Viterbi decoder disposed to receive a symbol embodying an encoded signal and configured to generate a first decoded output. A Reed-Solomon decoder is disposed to receive the first decoded output and is configured to generate a second decoded output. A trellis encoder is disposed to receive the second decoded output and configured to generate a re-encoded output. A slicer receives the received encoded signal and the re-encoded output, and is configured to generate a symbol output determine the particular symbol received from a plurality of possible symbols. Finally, a demapper is disposed to receive the symbol output of the slicer, wherein the demapper is configured to generate a plurality of output bits based upon the symbol received from the slicer and a predetermined constellation.

DESCRIPTION OF THE DRAWINGS

The accompanying drawings incorporated in and forming a part of the specification, illustrate several aspects of the present invention, and together with the description serve to explain the principles of the invention. In the drawings:

FIG. 2 is a block diagram illustrating a system having concatenated Reed-Solomon and trellis encoders, embodying the improvement of the present invention;

FIG. 3 is a block diagram illustrating a system having concatenated Reed-Solomon and trellis encoders, embodying a further improvement of an alternative embodiment of the present invention;

DETAILED DESCRIPTION OF THE PREFERRED EMBODIMENT

Figure 1:
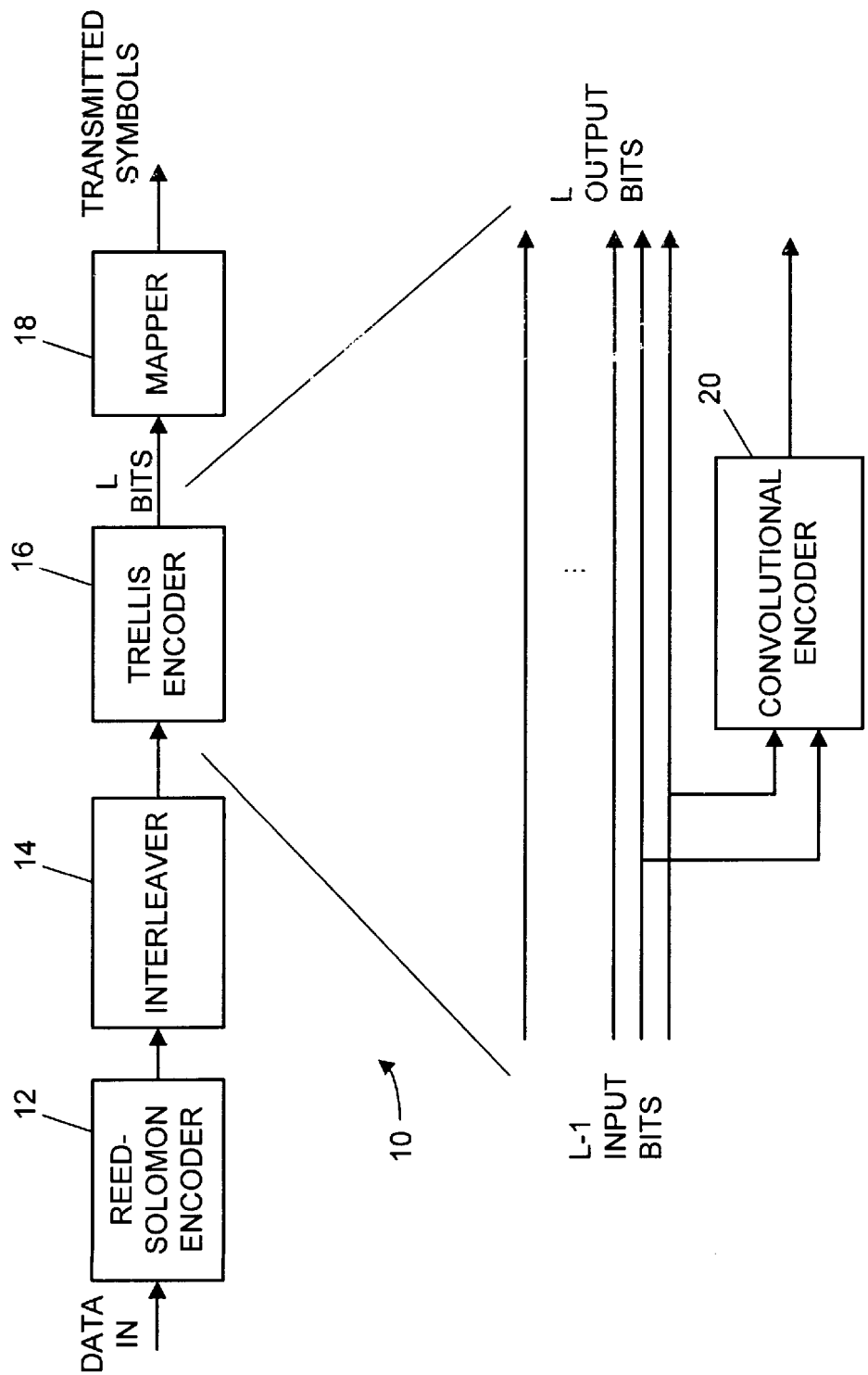
FIG. 1 is a block diagram illustrating a prior art system having concatenated Reed-Solomon and trellis encoders.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Referring now to FIG. 1, a block diagram of a prior art system configured to concatenate Reed-Solomon and trellis encoders is shown, and generally designated by reference numeral 10. In short, this system comprises a Reed-Solomon encoder 12, an interleaver 14, a trellis encoder 16, and a mapper 18. As briefly mentioned previously, Reed-Solomon encoding is a block coding technique which is well known in the art. Briefly, block encoding involves appending a series of parity bits onto a block of data. The parity bits contain parity information used for detection and correction of errors in the data block. Depending upon the number of data bits in the data block, and the number of parity bits appended to each data block, a certain number of errors can be detected and/or corrected in that block at the receiver end.

As is well known in the art, Reed-Solomon encoding provides a tradeoff between the number of errors that can be detected and the number of errors that can be corrected.

Specifically, if there are k data symbols and n-k parity symbols per block of a Reed-Solomon encoded signal, a maximum of n-k errors within the block can be detected while a maximum of (n-k)/2 errors can be corrected. However, the decoder cannot both detect and correct the maximum numbers set forth above. Rather, the more errors which can be corrected, the fewer errors which can be detected by the receiver, and the vice versa. For example, a (63, 53) is a well known Reed-Solomon code which has a coded sequence including 53 Reed-Solomon symbols and 10 (n−k=10) parity symbols for a total of 63 (n) symbols. Using this code, 10 symbol errors can be detected if none of the detected errors are corrected by the Reed-Solomon decoder, while a total of five symbol errors can be corrected if only those five are detected. In other words, if the number of corrections made is C, while the number of non-corrections is D, then 2C+D=10 for the (63,53) Reed-Solomon code. If more errors are detected in a given block of code than can be corrected, then the receiving element of the communication system typically requests a retransmission of that data block through an automatic repeat request scheme.

The output of the Reed-Solomon encoder 12 is time displaced by interleaver 14, which may be simply implemented as a block interleaver. As is known, the span of the interleaver is preferably the same as the length of the Reed-Solomon block, in order to spread the Reed-Solomon errors across many blocks. The output of interleaver 14 is the directed to the trellis encoder 16.

Trellis encoding is an error coding technique which is also well known in the art. Trellis codes are convolutional codes that are designed and optimized according to a specific modulation scheme. A convolutional encoder 20 encodes information symbols based upon the present input symbol and the state of the encoder. The present state of the encoder is determined by the symbols which previously entered the encoder. That is, the encoded symbol is a function of the present input symbol and also symbols that entered the encoder before the present input symbol. Convolutional codes are often implemented by shift registers and summers. The next state and the output of the encoder are functions of the present sate of the register or look-up table (i.e., the value of the bits presently stored within the register or look-up table memory), and the input to the register or look-up table.

As illustrated, the trellis encoder 16 generally operates on only a few of the bits output from the interleaver 14, and thus Reed-Solomon encoder 12. A is known, trellis encoders may be implemented with a variety of possible states. However, for purposes of illustration, an eight-state trellis encoder is shown. The trellis encoder receives two input bits and adds a third, redundant bit to the coded output. Thus, assuming that L-1 bits are output from the interleaver 14, then L bits are output from the trellis encoder 16, and thus input to the mapper 18.

Figure 5:
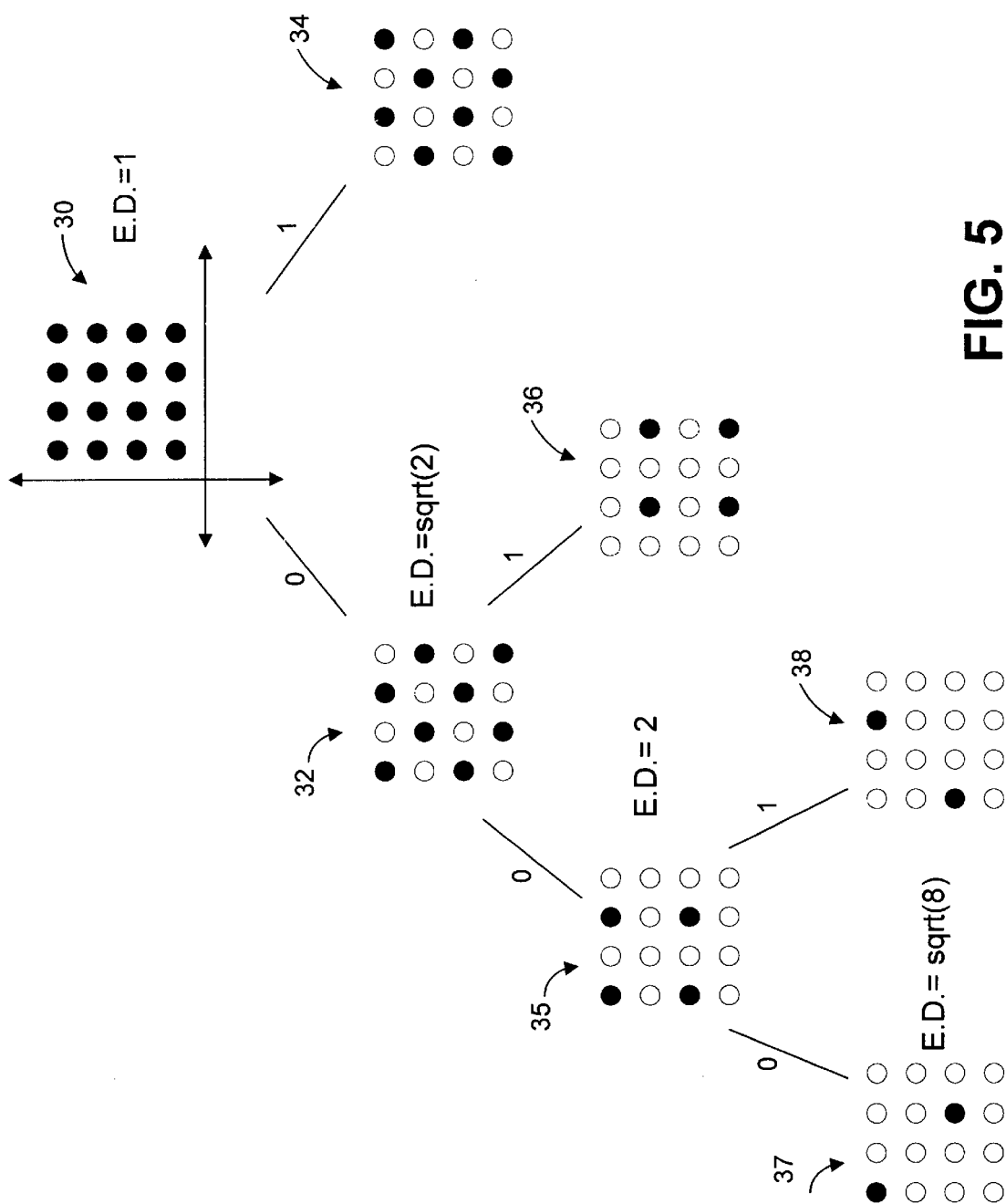
FIG. 5 is a diagram illustrating the process and coding improvement provided by trellis coding.

The mapper operates to uniquely assign the L input bits to a symbol in a $2^L$ signal constellation. To better understand this process, and to further describe the operation of the trellis encoder 16, reference is now made to FIG. 5. As is known, signal constellations are a convenient way to graphically depict binary data encode by means of various phase and amplitude modulation schemes. For example, FIG. 5 illustrates a single quadrant of a hypothetical 64 point signal constellation. It will be appreciated that the sixteen points illustrated in the single quadrant are duplicated in the remaining three quadrants. A six bit data word (i.e., symbol) is uniquely associated with each point on the signal constellation. Thus, a detector (at the receiver) is configured to assign a specified data word for a detected signal having a given amplitude and phase. In a manner that is known, signal constellations are generally defined by a combination of hamming distances and Euclidean distances. Trellis coding is a well known manner of improving the coding gain of a signal by performing set partitioning on the signal constellation. Specifically, trellis coding operates on the constellation points having the closest Euclidean measurements. Specifically, trellis coding operates to assign (set partition) every other constellation point to a first set 32 (or subset) of points and the remaining points to a second set 34 (or subset) of points. In the diagram of FIG. 5, the blackened circles represent data points assigned to a given set or subset of points. Thus, the signal constellation 30 shows all sixteen points blackened, while the subsets 32 and 34 each illustrate half of the points blackened, with the remaining points being empty circles. As the coding tree of FIG. 5 is traversed (from top to bottom), successively fewer points are blackened. It is a requirement of Unberboeck's set partitioning method (well known in the art), that the minimum Euclidean distances measured between any of the points on the subset constellations exceed the minimum Euclidean distance between points on the constellation from which the subsets are derived.

To illustrate numerically, assuming (as illustrated) that the constellation points 30 are separated by one unit distance in both the x and y directions, it is readily observed that the Euclidean distance separating the closest points in the constellation 30 is one (1). After the first level of partitioning, however, it is readily verified that the Euclidean distance separating the closest neighboring points of subsets 32 and 34 is 1.414 (square root of 2). Progressing further down the tree, the distance separating the closest neighboring points of subsets 35 and 36 is 2, while the distance separating the closes neighboring points of subsets 37 and 38 is 2.828 (square root of 8).

In short, the signal points that are closest together are the ones most susceptible to transmission error due to additive noise in the channel. Thus, trellis coding adds additional bit(s) of redundancy to code or protect these most susceptible points. In the preferred embodiment of the present invention an eight-state trellis coder 46 (See FIGS. 2 and 3), is implemented. This trellis encoder 46 receives two bits from the interleaver 44 and adds one redundant bit to its coded output.

Figure 4:
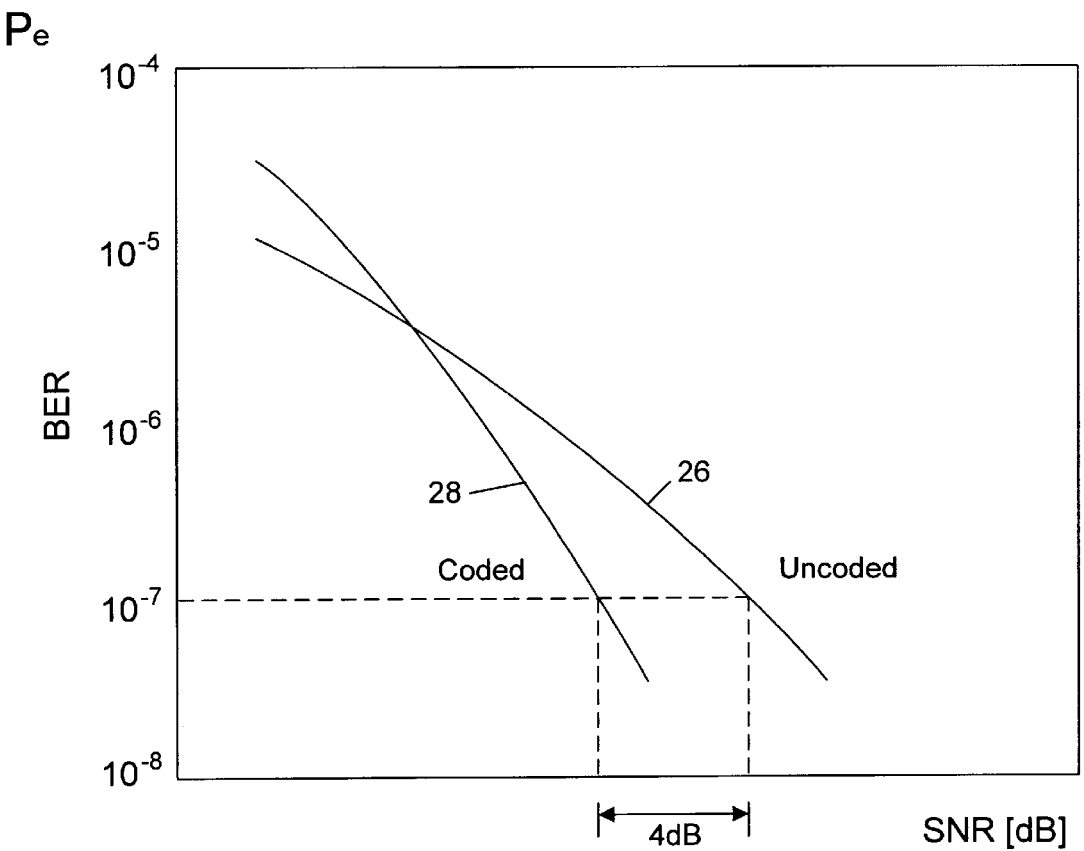
FIG. 4 is a diagram illustrating the coding gain achieved by the system of the present invention.

It can be shown that this measure of coding provides an additional 4 dB of coding gain to the system of the preferred embodiment, for a bit error rate (BER) of $10^{-7}$. In this regard, reference is made briefly to FIG. 4, which shows a diagram illustrating the effect of the coding gain provided by the eight-state trellis encoder of the present invention. Briefly, the horizontal axis demarcates the signal to noise ratio (SNR), while the vertical axis demarcates the probability of error ($P_e$). Although the graphs are only generally illustrated in the figure, it can be shown through calculations and simulations that the uncoded signals generally follow the curve 26, while coded signals generally follow the curve 28. At a given BER, $10^{-7}$ for example, the coding gain may be confirmed to be approximately 4 dB.

In many cases, Reed-Solomon codes are directed to detect or correct the channel corruption caused by impulse noise. In such embodiments, all transmitted bits should be protected by the Reed-Solomon encoder 12, as is illustrated in FIG. 1. However, in many other situations, data communications are running under the protection of a higher level application program, wherein the higher level application is configured protect against the adverse effect of impulse noise, by controlling the retransmission of corrupt data blocks received at a receiver. In this type of system or environment, improvements can be made by recognizing that the mapper provides certain innate noise immunity, particularly to additive channel noise.

It can be shown that the bits not coded by the trellis coder 46 are subject to a natural protection (by virtue of the Euclidean protection afforded by the mapper 48) of approximately 6 dB. Therefore, in applications that provide independent (application level) protection against impulse errors, these higher order bits need not be encoded by the Reed-Solomon encoder. Instead, these bits may be routed directly to the mapper 48.

In this regard, reference is now to FIG. 2, which is a block diagram of a transmitter adapted to concatenate Reed-Solomon and trellis encoders in a new and unique manner. As will be appreciated from the description that follows, the concatenated system of the present invention provides an efficient way to concatenate a Reed-Solomon code with a trellis code to achieve a high coding gain with short interleaving depth and reduced redundancy. As will be further appreciated, this method is particularly efficient at protecting against channel corruption caused by additive noise (including but not limited to additive gausian white noise—AWGN), as opposed to impulse noise. In this regard, the invention is particular suited for data applications where the impulse noise is handled at the application level, as by retransmitting corrupt data blocks. Furthermore, the concatenated signal of the present invention is applicable to many codes. The illustrated embodiment, however, will be described in connection with the eight-state trellis code and the Reed-Solomon code having a correction capability of two (e.g., t=2).

As shown, a system concatenates Reed-Solomon and trellis codes receiving an a plurality of information bits (denoted as "Data In") at an input 41. If this information is received in the form of serialized data, a serial to parallel converter 42 may be provided to convert the plurality of information bits into parallel form. The output of which may be partitioned into a first portion 43 and a second portion 47. The first portion 43 may be defined in terms of the signal constellation defined in terms of the signal constellation defined by the mapper 48 as having $2^L$ points, as L-m bits. The second portion may be defined as B bits, grouped to form k information symbols. Certainly, the number of bits per symbol will vary, depending upon various design considerations.

The k symbols of the second portion 47 are then directed to the Reed-Solomon encoder 44, which generates n output symbols, where n-k is the number of redundant symbols added by the Reed-Solomon encoder 44. The output of the Reed-Solomon encoder 44 is directed to interleaver 45. It will be appreciated that, although preferred, the interleaver 45 is optional. The interleaver 45, however, does provide additional immunity to channel fades, and for this reason is desired. Thereafter, m−1 of the bits output from the interleaver 45 are directed to the trellis encoder 46, which, as described above, adds one additional bit of redundancy. This redundancy provides approximately 4 dB of coding gain to the constellation points having closest Euclidean separation.

According to the foregoing description, 6 dB of coding gain is achievable without coding some of the information bits. It is appreciated that the number of redundant bits per symbol is reduced, by not passing the uncoded its of the trellis code through the Reed-Solomon encoder 44. As a result, the depth of the interleaver, needed to recover from an error event at the trellis decoder (See FIG. 6) is much smaller than that required for the conventional structure as shown in FIG. 1. By reducing the depth of the interleaver 45, the amount of memory required is correspondingly reduced. In addition, the transmission delay is reduced, since a much smaller amount of data needs to be written into the interleaver 45. It will be further appreciated that the structure presented in FIG. 2 can utilize a Reed-Solomon encoder 42 without any interleaver, even when the correction capability of the Reed-Solomon encoder 42 is small (e.g., 2).

In a conventional concatenation (FIG. 1), interleaving is essential, since the Reed-Solomon code will cause a severe degradation in the performance of the system (as opposed to increasing coding gain). This performance degradation increases with increasing size of the signal constellation. In this regard, it should be appreciated that the Reed-Solomon encoder 42 is beneficial only when an error event of the trellis decoder (See FIG. 6) can be corrected by the Reed-Solomon decoder. However, for the concatenation of the system of FIG. 1 in connection with a large signal constellation, an error event in the trellis decoder corrupts more than two Reed-Solomon symbols.

An additional coding gain may be achieved by the further improvement to the alternative embodiment illustrated in FIG. 3. Specifically, the further improvement includes the addition of a second coding level. Preferably this additional coding level is added in the form of a parity check code 49, although other coders may be used consistent with the concepts and teachings of the further improvement. In short, additional coding gain is achievable by adding simple error correction codes to protect one or more of the uncoded bits. The improvement achieved by adding a single parity bit further increases the minimum squared Euclidean distance associated with uncoded bits. Of course, an appropriate decoder for the foregoing parity check code should be added to the receiver, at the output of the demapper. The improved concatenated code is a type of multilevel code with component codes that are not necessarily binary codes.

Figure 6:
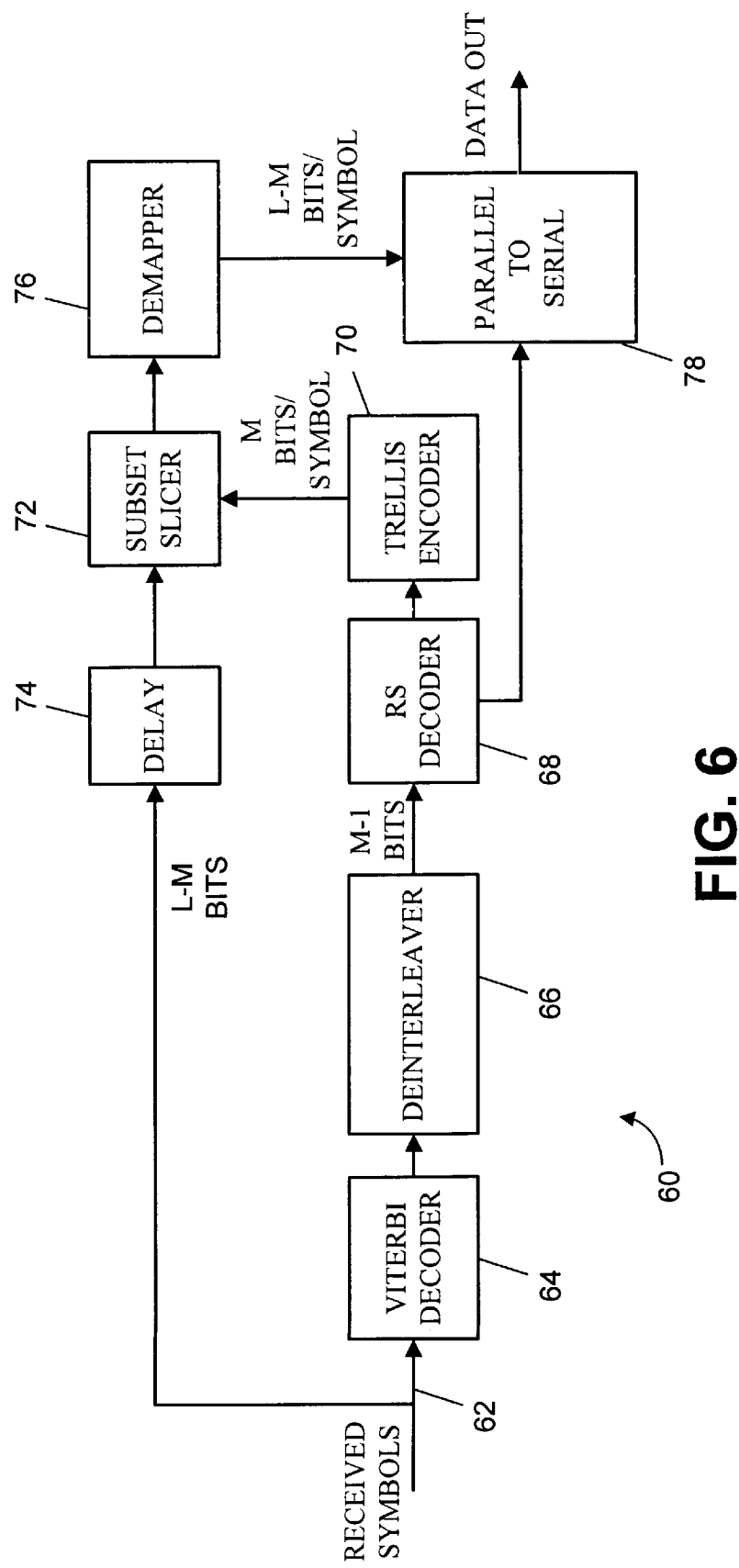
FIG. 6 is a block diagram illustrating a receiver for receiving and decoding a symbols having concatenated Reed-Solomon and trellis codes, constructed in accordance with the present invention.

Reference is now made to FIG. 6, which is a block diagram depicting a receiver for receiving and decoding concatenated symbols constructed by the transmitter of FIG. 2. The receiver 60 includes an input 62 for receiving transmitted symbols. The received symbols are directed to a Viterbi decoder 64, which decodes the trellis encoded symbol. Viterbi decoding is well known, and need not be described herein. Suffice it to say that Viterbi decoder 64 performs a maximum-likelihood detection in an efficient fashion, by traversing the shortest path through the trellis diagram for the trellis encoder 46. Next, the output of the Viterbi decoder 64 is deinterleaved by deinterleaver 66, which performs the reciprocal operation to that performed by interleaver 45.

The output of deinterleaver 66 is directed to a Reed-Solomon decoder 68, which performs the inverse operation to that performed by the Reed-Solomon encoder 44. The output of the Reed-Solomon decoder is then encoded by trellis encoder 70, the output of which is directed to a slicer (or subset slicer) 72. As illustrated, a parallel path is directed from the input 62 to the slicer 72, through a delay element 74. Since the received symbol is to be compared with the encoded symbol output from trellis encoder 70, the delay element simply delays the input symbol for an amount of time sufficient to allow the Viterbi decoder 64, deinterleaver 66, Reed-Solomon decoder 68, and trellis encoder 70 to operate on the received symbol, so that the slicer may compare both paths. In a manner that is known, the slicer determines which signal point on the predetermined constellation diagram that the received symbol is. This symbol is then sent to demapper 76, which performs the inverse operation of mapper 48, to produce L-m output bits per symbol and directs those bits to a parallel to serial converter 78. The remaining m bits are delivered from the Reed-Solomon decoder 68 directly to the parallel to serial converter 78.

For the foregoing receiver/decoder, in the case of an eight-state 2-D trellis code, where m=3, the Viterbi decoder provides an estimation of two information bits per symbol. Namely, in the case of Reed-Solomon code over $GF(2^8)$, four channel symbols are needed to construct one Reed-Solomon symbol. Therefore, even for the simple Reed-Solomon code with the correction capability of t=2, an error event of up to five corrupted channel symbols is guaranteed to be corrected. Since most of the dominant error events of the eight-state 2-D trellis code have a length of less than five channel symbols, a significant improvement can be achieved even without an interleaver 45 or deinterleaver 66.

The decisions made by the Viterbi decoder 64 are further corrected by the Reed-Solomon decoder 68. The estimated codeword of the Reed-Solomon code is encoded again by the same encoder used at the transmitter. The m bits per symbol at the output of the late trellis encoder are representing an estimation of the subset from which the transmitted channel symbol was chosen. The subset slicer 72 is aimed at estimating the uncoded bits (by detecting the transmitted symbol from a given subset), assuming that a correct decision on the subset was made by the concatenated Viterbi decoder 64 and Reed-Solomon decoder 68. Notice that the delay at the input of the subset slicer is desired to compensate for the latency required by the Viterbi and Reed-Solomon decoder.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. An apparatus for communicating data symbols having concatenated Reed-Solomon and trellis codes comprising:

a Reed-Solomon encoder having k input symbols and n output symbols;

a trellis encoder disposed to receive to encode the output of the Reed-Solomon encoder and generate encoded output bits; and a mapper defined by a signal constellation having $2^L$ points, the mapper disposed to receive the encoded output bits, any portion of the output of the Reed-Solomon not received by the trellis encoder, and p information bits not input to the Reed-Solomon encoder, and generate an output symbol, the mapper being configured to generate unique output symbols forming a constellation, wherein the p information bits not input to the Reed-Solomon define $2^P$ evenly distributed points of the signal constellation having the greatest Euclidean separation, where p is less than L.

2. The apparatus as defined in claim 1, further including an interleaver interposed between the Reed-Solomon encoder and the trellis encoder.

3. The apparatus as defined in claim 1, further including a serial to parallel converter for receiving serial data in and generating a plurality of output bits.

4. The apparatus as defined in claim 1, further including a second level encoder interposed between an input carrying the input bits and the mapper, the second level encoder configured to receive at least a portion of the input bits and generate an additional level of error correction coded bits.

5. The apparatus as defined in claim 1, wherein the Reed-Solomon is defined by an error-correction capability of 2.

6. The apparatus as defined in claim 1, wherein the trellis encoder is an eight-state trellis encoder.

7. The apparatus as defined in claim 1, wherein the mapper defines a two hundred fifty six point carrierless AM/PM signal constellation.

8. An apparatus for concatenating Reed-Solomon and trellis encoders comprising:

an input for receiving a plurality of information bits, the plurality of information bits having a first portion and a second portion;

a Reed-Solomon encoder disposed to receive the second portion of input bits and generating a first encoded output;

a trellis encoder disposed to receive the output of the Reed-Solomon encoder and configured to generate a second encoded output; and a mapper having a plurality of input bits, the input bits comprising the second encoded output and the first portion, the mapper being configured to generate output signals that are uniquely defined by the input bits in accordance with a set partition, wherein the first portion of input bits are defined by the mapper to generate output symbols having the larger Euclidean distances than the Euclidean distances separating the symbols defined by the second encoded output bits.

9. The apparatus as defined in claim 8, further including an interleaver interposed between the Reed-Solomon encoder and the trellis encoder.

10. The apparatus as defined in claim 8, further including a serial to parallel converter for receiving serial data in and generating n output bits, the n output bits being the n information bits.

11. The apparatus as defined in claim 8, further including a second level encoder interposed between the input and the mapper, the second level encoder configured to receive at least a portion of the input bits and generate an additional level of error correction coded bits.

12. A method for concatenating Reed-Solomon and trellis codes comprising the steps of:

receiving a plurality of information bits, the information bits being defined by a first portion of input bits and a second portion of input bits;

encoding the second portion of the plurality of information bits with a Reed-Solomon encoder, the Reed-Solomon encoder generating a plurality of first encoded output bits;

encoding a plurality of the first encoded output bits with a trellis encoder, the trellis encoder generating a plurality of second encoded output bits; and mapping into a signal constellation the first portion of information bits, all of the first encoded output bits that are not encoded by the trellis encoder, and the second encoded output bits, the mapper being configured to generate output symbols defined by the signal constellation, wherein the first portion of input bits are defined by the mapper to generate output symbols having the larger Euclidean distances than the Euclidean distances separating the symbols defined by the second encoded output bits.

13. The method as defined in claim 12, further including the step of interleaving the first encoded output bits.

* * * * *